UNITED STATES PATENT OFFICE.

EDWARD J. PUGH, OF GLENSIDE, PENNSYLVANIA, ASSIGNOR TO PENNSYLVANIA SALT MANUFACTURING COMPANY, OF PHILADELPHIA, PENNSYLVANIA, A CORPORATION OF PENNSYLVANIA.

BASIC SULFATE OF ZIRCONIUM AND METHOD OF MAKING THE SAME.

1,316,107.          Specification of Letters Patent.     Patented Sept. 16, 1919.

No Drawing.       Application filed July 15, 1918. Serial No. 245,046.

*To all whom it may concern:*

Be it known that I, EDWARD J. PUGH, residing at Glenside, Montgomery county, Pennsylvania, have invented new and useful Basic Sulfate of Zirconium and Methods of Making the Same, of which the following is a full, clear, and exact description.

My invention provides a simple and comparatively inexpensive method, by means of which a substantially pure zirconium oxid may be obtained.

It has heretofore been proposed to produce zirconium oxid by first preparing a zirconium oxychlorid and treating this with a definite amount of sulfuric acid, the mixture being allowed to stand in the cold or at about 40° C., when a basic sulfate of zirconium having the composition ($3ZrO_2.2H_2SO_4$) separates in small prisms which are free from iron and titanium. This basic sulfate of zirconium can be converted to zirconium oxid by any well-known method. The method is, however, objectionable in that the time required for the precipitation of the basic sulfate of zirconium extends over a great number of days. Further, the precipitation is never complete, less than 75% precipitating out in two weeks.

It has also been proposed to produce zirconium oxid by preparing a sulfate of zirconium, dissolving this in water and adding hydrochloric acid and ammonia, whereby a precipitate of basic sulfate of zirconium having a composition of (60–66%, $ZrO_2$, 10–15% $SO_3$) is obtained.

It has also been proposed to use an oxychlorid of zirconium of a composition $Zr_5O_8Cl_4.22H_2O$, which is dissolved in water and a definite quantity of sulfuric acid added, whereby basic sulfate is precipitated having the composition $5ZrO_2.2SO_3.14H_2O$.

The first named of these two methods is expensive on account of the use of ammonia which is required, and the product obtained is an impure one, which must be purified by later processes where a pure product is desired. The last-named method is expensive, since a weak solution containing hydrochloric acid must be evaporated and since only a part of the zirconium is converted into the desired new basic oxychlorid.

I have discovered that a new basic sulfate of zirconium substantially free from iron, titanium and silicon and which may be converted to pure zirconium oxid by well-known methods, may be simply and cheaply produced as follows: Oxychlorid of zirconium which has been manufactured by any of the well-known methods is dissolved in sufficient water to form a solution containing approximately 33 grams per liter of $ZrO_2$, and the solution is made acid with hydrochloric acid. I prefer to use about 10 grams of hydrochloric acid per liter. This solution is mixed with sulfuric acid in the proportion of $5ZrO_2$ to $3H_2SO_4$. So long as the solution remains cold, little or no precipitate is formed, but upon heating a white crystalline precipitate is formed having the composition $5ZrO_2.3SO_3.13H_2O$. The zirconium is thus precipitated as a new basic sulfate free from iron, titanium and silicon and capable of ready conversion to pure zirconium oxid in any well-known manner.

As a more specific example, a quantity of zirconium oxychlorid containing 100 grams of zirconium oxid is dissolved in three liters of water; this solution is acidified with hydrochloric acid and an addition of 48 grams of sulfuric acid is made. Upon heating, the precipitate above described is obtained.

I do not desire to limit myself to the particular proportions and temperatures which I have herein given, as these may be varied within the spirit and scope of the appended claims.

I claim:

1. As a new article of manufacture, a basic sulfate of zirconium, consisting of the precipitate resulting from the addition of sulfuric acid to an acid solution of zirconium oxychlorid in the proportion of $5ZrO_2$ to $3H_2SO_4$.

2. As a new article of manufacture, a basic sulfate of zirconium, consisting of the precipitate resulting from the addition of sulfuric acid to a solution of zirconium oxychlorid, in the presence of hydrochloric acid.

3. As a new article of manufacture, a zirconium basic sulfate having substantially the composition $5ZrO_2.3SO_3.13H_2O$.

4. The herein described method of making a new basic sulfate of zirconium which consists in adding sulfuric acid to an acid solution of zirconium oxychlorid and heating the same.

5. The herein described method of making a basic sulfate of zirconium which consists in adding sulfuric acid to a solution of zirconium oxychlorid in the presence of hydrochloric acid and heating the same.

In testimony whereof I have hereunto set my hand.

EDWARD J. PUGH.